US012684662B2

(12) United States Patent
Zhu et al.

(10) Patent No.: US 12,684,662 B2
(45) Date of Patent: Jul. 14, 2026

(54) HIGH-EFFICIENCY HEATING DEVICE IN MICROWAVE CHAMBER AND HEATING METHOD THEREOF

(71) Applicant: Sichuan University, Chengdu (CN)

(72) Inventors: Huacheng Zhu, Chengdu (CN); Fengming Yang, Chengdu (CN); Yang Yang, Chengdu (CN)

(*) Notice: Subject to any disclaimer, the term of this patent is extended or adjusted under 35 U.S.C. 154(b) by 819 days.

(21) Appl. No.: 18/098,706

(22) Filed: Jan. 19, 2023

(65) Prior Publication Data

US 2023/0156878 A1 May 18, 2023

(30) Foreign Application Priority Data

Jul. 21, 2022 (CN) ......................... 202210872874.0

(51) Int. Cl.
*H05B 6/70* (2006.01)
*H05B 6/72* (2006.01)

(52) U.S. Cl.
CPC ............... *H05B 6/708* (2013.01); *H05B 6/72* (2013.01)

(58) Field of Classification Search
CPC .......... H05B 6/72; H05B 6/708; H05B 6/707; H05B 6/701
See application file for complete search history.

(56) References Cited

U.S. PATENT DOCUMENTS 3,838,368 A * 9/1974 Ironfield ................ H05B 6/707 333/210
4,121,078 A * 10/1978 Takano .................. H05B 6/705 219/757

* cited by examiner

*Primary Examiner* — Rodolphe Andre Chabreyrie

(57) ABSTRACT

The invention relates to the technical field of microwave heating, and more particularly to a high-efficiency heating device in a microwave chamber and a heating method thereof. A high-efficiency heating device in a microwave chamber, comprising: a heating chamber; a straight-walled waveguide with microwave asymmetric propagation function; wherein one end of the straight-walled waveguide is communicated with the heating chamber; and at least one group of unidirectional waveguide structures, which are attached to an inner sidewall of the straight-walled waveguide; wherein the unidirectional waveguide structures comprise a first medium section and a second medium section which are provided along the microwave transmission direction; wherein a dielectric constant of the first medium section gradually increases along the microwave transmission direction and has a maximum value of $\varepsilon_{max}$, a dielectric constant of the second medium section is a constant value of $\varepsilon_c$, and $\varepsilon_{max}=\varepsilon_c$.

9 Claims, 4 Drawing Sheets

HIGH-EFFICIENCY HEATING DEVICE IN MICROWAVE CHAMBER AND HEATING METHOD THEREOF

CROSS REFERENCE OF RELATED APPLICATION

The present application claims priority under 35 U.S.C. 119(a-d) to CN 202210872874.0, filed Jul. 21, 2022.

BACKGROUND OF THE PRESENT INVENTION

Field of Invention

The invention relates to the technical field of microwave heating, and more particularly to a high-efficiency heating device in a microwave chamber and a heating method thereof.

Description of Related Arts

As a new type of high-efficiency and clean energy, microwave energy has the characteristics of high efficiency and energy saving, selective heating, clean and pollution-free, etc., and has a wide range of applications in food processing, chemical industry, medicine and other fields. Especially in the chemical and metallurgical industries with high energy consumption, the application of microwaves shows obvious advantages in energy saving and emission reduction. Compared with traditional heat sources, microwave heating has the characteristics of high power, good controllability, and selective heating. Compared with the microwave single-mode heating chamber, the microwave multi-mode chamber has the advantages of large capacity and good heating uniformity and is widely used. However, in microwave heating, due to the different shapes, volumes and dielectric constants of the heated objects, the efficiency of microwave heating is also different, and the existing microwave multi-mode heating cavities are difficult to apply to efficient heating of various loads.

When the microwave heating efficiency is low, the reflected microwave energy is large. All the energy output by the microwave source cannot be absorbed by the load, resulting in a waste of energy. In addition, in the high-power industrial application of microwave energy, industrial materials, as high-power microwave loads, are typical complex time-varying non-uniform media, and their ability to absorb/reflect microwaves will undergo drastic nonlinear changes with time and temperature. Intense microwave reflection is catastrophic for high-power systems. It not only wastes huge energy, but also easily damages microwave devices. Therefore, the efficient use of microwave power in different states and the prevention of microwave sources from being damaged by reflected power are the premise of efficient and stable application of power microwave heating system.

In view of the problems of low heating efficiency and microwave reflection in the microwave heating process, in the conventional arts, a circulator and a water load are generally used to absorb the reflected microwaves to prevent the reflected microwave energy from damaging the microwave source. For example, the Chinese invention patent with a publication number CN112569885B discloses a microwave reaction device with reflection protection. By setting a circulator and a water load, the device can efficiently absorb the reflected microwave and protect the microwave source, so that the application safety is higher, and the service life of the device is longer. However, the above microwave reaction device also has certain defects. For example, since the circulator is a ferrite device, additional insertion loss will be introduced to the system during utilization. When the device works in a high-power continuous wave state, the consumption of power is continuously converted into heat, causing the device to heat up and even lose effect of isolation completely. Therefore, the performance of this device is limited by the operating temperature and power, and the reflected power is absorbed by the water load, resulting in serious energy waste. At the same time, in the conventional arts, the heating efficiency of the microwave is also improved by using a three-stubs adjuster, but the use of the three-pin adjusters to enhance the efficiency requires real-time adjustment of the pins during the entire heating process, and the three-pin adjuster has a blind spot of impedance match for deployment, and the cost is high. Some of the three-pin microwave heating devices with intelligent deployment function also have certain shortcomings as follows. (1) The reflected power is prone to surge during the deployment process, and the deployment time is too long, which can easily cause damage to the microwave source. (2) There is a impedance matching blind spot in the three-pin adjustment. (3) The automatic allocation of three pins requires additional introduction of a series of modules such as complex reflection coefficient measurement devices, arithmetic circuits, and stepper motors, which are expensive and reduce the stability of the system.

However, none of the above technical solutions can practically and completely solve the problems of low heating efficiency and microwave reflection in the microwave heating process. Therefore, the large-scale application of microwave energy requires a device that is simpler and can improve the utilization rate of microwave energy in different states.

SUMMARY OF THE PRESENT INVENTION

In order to solve the above technical problems, an object of the present invention is to provide a high-efficiency heating device in a microwave chamber and a heating method thereof. The high-efficiency heating device in the microwave chamber has a simple structure, and can improve the utilization rate of microwave energy and effectively solve the problem of microwave reflection in different states, so as to prolong the life of the microwave source, reduce the use of protection devices such as circulators, reduce equipment costs, and improve safety of the microwave heating.

Accordingly, in order to achieve above-mentioned technical effect, the present invention adopts following technical solutions.

A high-efficiency heating device in a microwave chamber, comprises:

a heating chamber;

a straight-walled waveguide with an asymmetric transmission function; wherein one end of the straight-walled waveguide is communicated with the heating chamber; and at least one group of microwave unidirectional propagation structures, which are attached to an inner sidewall of the straight-walled waveguide; wherein the microwave unidirectional propagation structures comprise a first medium section and a second medium section which are provided along the microwave transmission direction; wherein a dielectric constant of the first medium section gradually increases along the microwave transmission direction and has a maximum value of $\varepsilon_{max}$, a dielectric constant of the second medium section is a constant value of $\varepsilon_c$, and $\varepsilon_{max}=\varepsilon_c$.

Preferably, a tail end of the second medium section protrudes out of the straight-walled waveguide and partially extends into an interior of the heating chamber.

Preferably, a head end of the second medium section is in closely connected with a tail end of the first medium section, or the second medium section and the first medium are a one-piece structure.

Preferably, a thickness of the second medium section is equal to a maximum thickness of the first medium section.

Preferably, a height of the unidirectional waveguide structure is greater than or equal to ⅔ of a height of the inner sidewall of the straight-walled waveguide where it is attached.

Preferably, a groove group is provided on one outer surface of the first medium section, and the groove group comprises a plurality of longitudinal grooves provided in parallel from a head end to the tail end of the first medium section, and a depth of the longitudinal grooves gradually decreases from the head end to the tail end of the first medium section.

Preferably, a thickness of the first medium section gradually increases from the head end to the tail end of the first medium section.

Preferably, a medium hole group is provided inside the first medium section (31), and the medium hole group comprises a plurality of longitudinal medium holes provided in sequence along a direction from the head end to the tail end of the first medium section, interiors of the medium holes are provided with filling medium, a cross-sections of the medium holes are all circular, and diameters of the medium holes gradually increase or decreases in the direction from the head end to the tail end along the first medium section.

Preferably, a tray is further provided in the heating chamber (10) for placing an object to be heated.

The present invention further provides a high-efficiency heating method in the microwave chamber, comprising: heating the object to be heated by using the high-efficiency heating device in the microwave chamber, wherein the object to be heated is placed in the heating chamber in a static or movable manner.

Compared with the prior art, the beneficial effects of the present invention are as follows.

The high-efficiency heating device in the microwave chamber and the heating method thereof provided by the present invention are provided by providing at least one group of unidirectional waveguide structures on the inner sidewall of a straight-walled waveguide that transmits electromagnetic waves, and the electromagnetic waves are converted into surface waves through the unidirectional waveguide structures and unidirectionally transmitted into the heating chamber, thereby realizing high-efficiency heating of the object to be heated in the heating chamber, effectively solving the problems of microwave reflection and low heating efficiency, and improving microwave heating efficiency and safety. In addition, the overall structure of the high-efficiency heating device in the microwave chamber is simple, so that the microwave heating is easier to implement, the cost of the microwave heating can be greatly reduced, the structure of the existing microwave heating device can be simplified, so as to extend the life of the microwave source, reduce the use of protective devices such as circulators, reduce equipment costs, and improve the safety of microwave heating.

These and other objectives, features, and advantages of the present invention will become apparent from the following detailed description, the accompanying drawings, and the appended claims.

Figure 1:
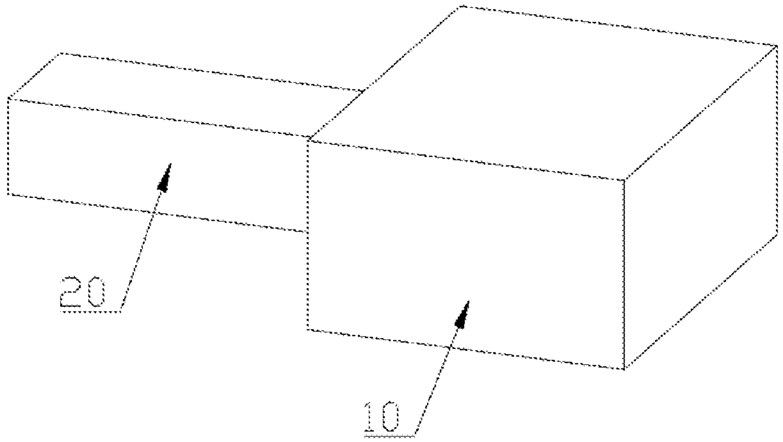
FIG. 1 is a schematic diagram of an overall structure of a high-efficiency heating device in a microwave chamber according to an Embodiment 1 of the present invention.

Reference numerals are: 10—heating chamber, 20—straight-walled waveguide, 30—one-way waveguide structure, 31—first medium section, 32—second medium section, 40—tray, 41—object to be heated, 51—longitudinal grooves, 52—medium holes.

DETAILED DESCRIPTION OF THE PREFERRED EMBODIMENT

Embodiments of the technical solutions of the present invention will be described in detail below with reference to the accompanying drawings. The following examples are only used to more clearly illustrate the technical solutions of the present invention, and are therefore only used as examples, and cannot be used to limit the protection scope of the present invention.

Unless otherwise specified, in the present invention, orientation or positional relationship indicated by the terms "length", "width", "upper", "lower", "front", "rear", "left", "right", "vertical", "horizontal", "top", "bottom", "inner", "outer", "clockwise", "counterclockwise", "axial", "radial", "circumferential", "x-direction", "y-direction", "z-direction", etc. is based on the orientation or positional relationship shown in the drawings, and is only for the convenience of describing the present invention and simplifying the description, rather than indicating or implying that the indicated device or element must have a specific orientation, construction and operation in a specific orientation, so the terms describing the orientation or positional relationship in the present invention are only used for exemplary illustration, and should not be construed as a limitation on this patent accompanying drawings, and understand the specific meanings of the above terms according to specific situations.

It should be noted that the terms "head end" and "tail end" in the present invention are both based on the transmission direction of microwaves. The "head end" refers to the direction close to the direction from which the microwaves are transmitted, and the "tail end" refers to the direction to which the microwaves are transmitted.

Embodiment 1

Figure 2:
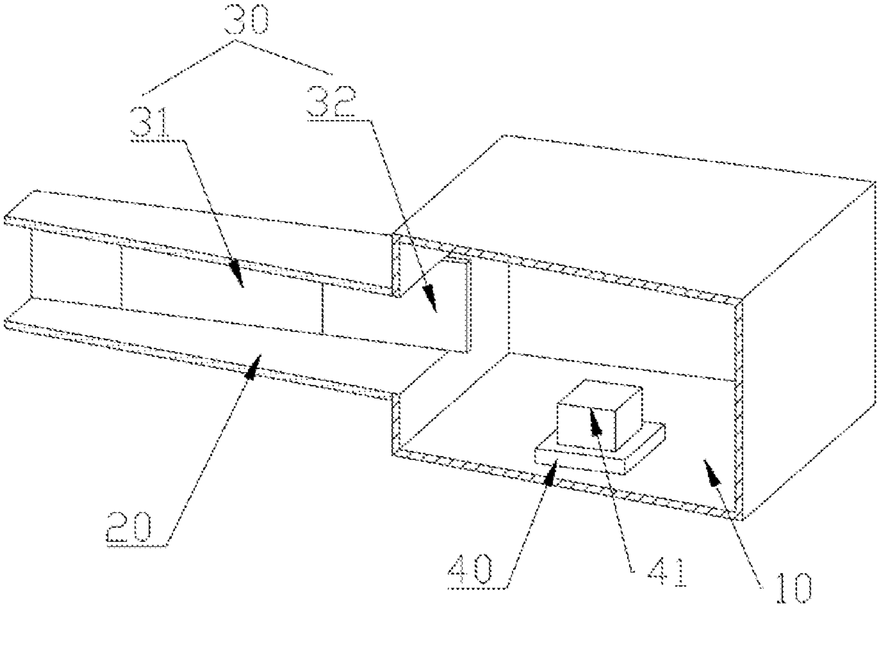
FIG. 2 is a schematic longitudinal cross-sectional structural diagram of a the high-efficiency heating device in the microwave chamber according to the Embodiment 1 of the present invention.

As shown in FIGS. 1-2, this embodiment is the first embodiment of the present invention. The present embodiment provides a high-efficiency heating device in a microwave chamber, comprising: a heating chamber 10, a straight-walled waveguide 20 with asymmetric transmission function and one end connected with the heating chamber 10, and two sets of unidirectional waveguide structures 30. Specifically, the straight-walled waveguide 20 is configured to transmit TE waves, and a cross-section of the straight-walled waveguide 20 is a rectangular structure provided on the inner sidewall of the unidirectional waveguide structure 30, and each group of the unidirectional waveguide structures 30 comprises a first medium section 31 and a second medium section 32 arranged in sequence along the microwave transmission direction, and the dielectric constant of the first medium section 31 is along the microwave transmission direction. The direction gradually increases and the maximum value is $\varepsilon_{max}$, the second medium section 32 is a value of 0 whose dielectric constant is stable value of $\varepsilon_c$, and $\varepsilon_{max}=\varepsilon_c$.

In this embodiment, the unidirectional waveguide structure 30 can be bonded or embedded on the inner sidewall of the straight-walled waveguide 20, so that the unidirectional waveguide structure 30 is attached to the inner sidewall of the straight-walled waveguide 20, the first medium section 31 and the second medium section 32 are both plate-like or sheet-like structures, and at the same time, the head end of the second medium section 32 is in close contact with the tail end of the first medium section 31, and the second medium section 32 is in close contact with the tail end of the first medium section 31. The thickness of the medium section 32 is equal to the maximum thickness of the first medium section 31. In addition, the end of the second medium section 32 protrudes out of the straight-walled waveguide 20 and extends to the interior of the heating chamber 10, and the end portion of the second medium section 32 extends to the interior of the heating chamber 10 and The length of the second medium section 32 extending into the heating chamber 10 is ⅓ of the length of the heating chamber 10, and the height of the unidirectional waveguide structure 30 is equal to the inner wall of the straight-walled waveguide 20 high.

In this embodiment, in order to realize the gradient of the dielectric constant of the first medium section 31, the first medium section 31 can be designed and constructed in any of the following ways, specifically including:

First Mode

Figure 3:
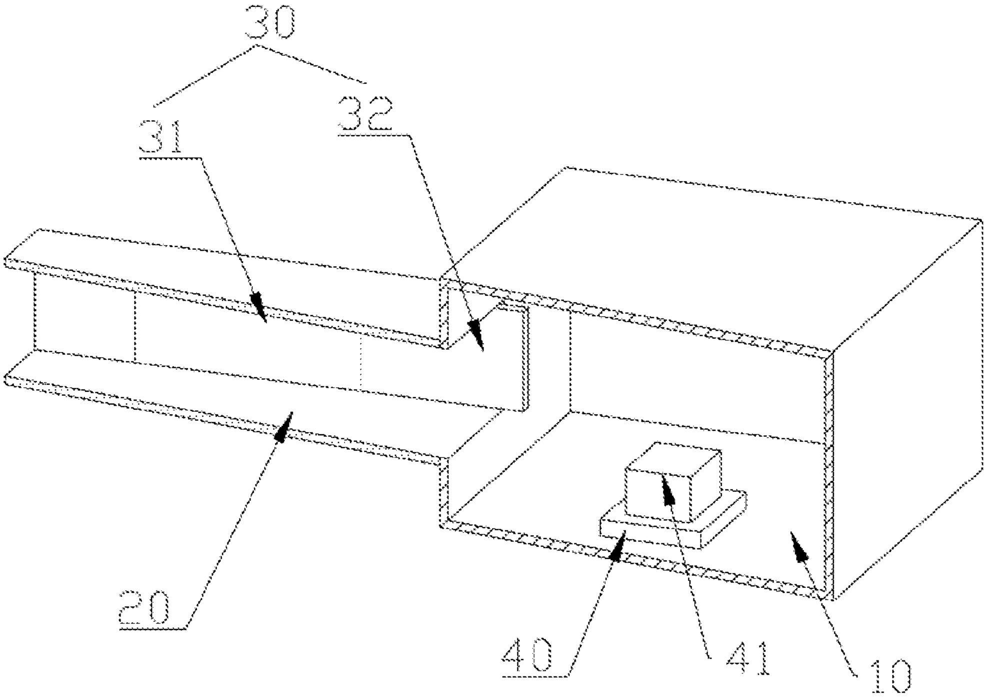
FIG. 3 is a schematic structural diagram of a first configuration mode of a first medium section of a high-efficiency heating device in the microwave chamber according to the Embodiment 1 of the present invention.

As shown in FIG. 3, a groove group is provided on one outer surface of the first medium section 31, and the groove group includes a plurality of longitudinal grooves 51 arranged in parallel from the head end to the tail end of the first medium section 31, and the longitudinal grooves 51 are arranged at equal distances, and the depth of the longitudinal grooves 51 gradually decreases from the head end to the tail end of the first medium section 31, and the cross-sections of the longitudinal grooves 51 are all rectangular.

Second Mode

Figure 4:
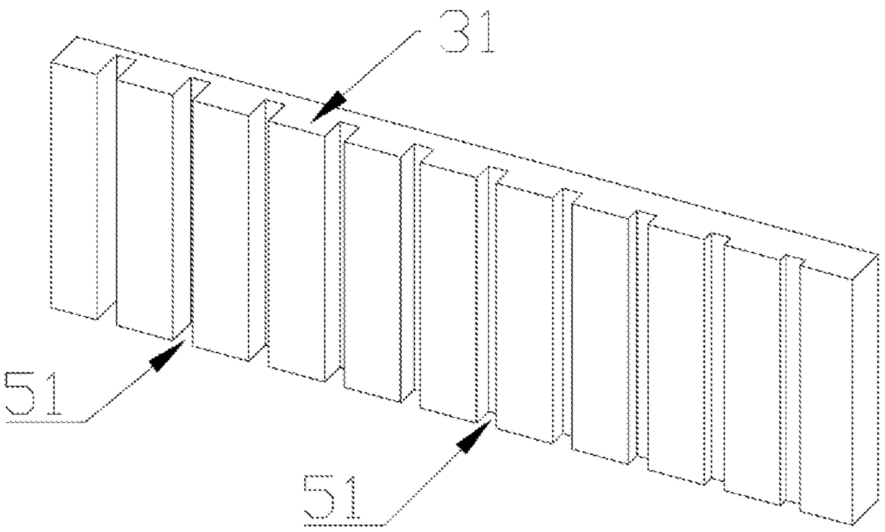
FIG. 4 is a schematic structural diagram of a second configuration mode of the first medium section of the high-efficiency heating device in the microwave chamber according to the Embodiment 1 of the present invention.

As shown in FIG. 4, the thickness of the first medium section 31 gradually increases from the head end to the tail end of the first medium section 31, so that the dielectric constant of the first medium section 31 is gradually changed, and the first medium section 31 is the dielectric constant of the medium section 31 gradually increases from the head end to the tail end of the first medium section 31.

Third Mode

Figure 5:
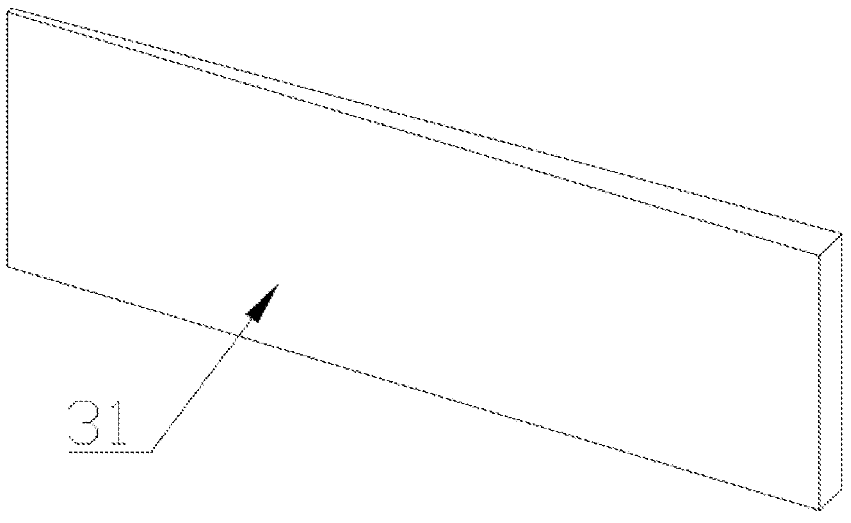
FIG. 5 is a schematic structural diagram of a third configuration mode of the first medium section of the high-efficiency heating device in the microwave chamber according to the Embodiment 1 of the present invention.

As shown in FIG. 5, a medium hole group is arranged inside the first medium section 31, and the medium hole group includes a plurality of longitudinal medium holes 52 arranged in sequence along the direction from the head end to the tail end of the first medium section 31, the medium hole 52 runs through the first medium section 31 in the longitudinal direction, and the inside of the medium hole 52 is filled with a filling medium. Specifically, in order to realize that the dielectric constant of the first medium section 31 gradually increases along the direction from the head end to the tail end of the first medium plate, the cross sections of the medium holes 52 are all circular, and the medium holes the aperture of 52 gradually increases along the direction from the head end to the tail end of the first medium section 31, and the dielectric constant of the filling medium filled in the medium hole 52 is greater than the dielectric constant of the material of the first medium section 31, so that the dielectric constant of the material of the first medium section 31 is The dielectric constant of the first medium section 31 gradually increases along the direction from the head end to the tail end of the first medium section 31, and in order to make $\varepsilon_c=\varepsilon_{max}$, the first medium section 31 and the second medium section 32 can be made of different materials. On the contrary, when the dielectric constant of the filling medium filled in the medium hole 52 is smaller than the dielectric constant of the material of the first medium section 31, the diameter of the medium holes 52 constituting the medium hole group is along the first medium section 31. The direction from the end to the end gradually decreases, so that the dielectric constant of the first medium section 31 gradually increases along the direction from the beginning to the end of the first medium plate. At this time, the first medium section 31 and the second medium section 32 can be made of the same or different materials and have $\varepsilon_c=\varepsilon_{max}°$.

In addition, in the microwave chamber high-efficiency heating device provided in this embodiment, a tray 40 is further provided in the heating chamber 10 for placing the object to be heated 41, and the tray 40 can be movably or fixedly connected with the heating chamber 10. For the purpose of facilitating adjustment of the position of the object to be heated 41, the object to be heated 41 can be heated with high efficiency.

In this embodiment, by attaching the first medium section 31 and the second medium section 32 to the two opposite inner walls of the straight-walled waveguide 20, the electromagnetic wave generates a sudden change in phase when it encounters the first medium section 31, and this abrupt phase changes continuously in the direction of the interface, and the electromagnetic wave gradually changes into a surface wave after passing through this meta-interface material for many times, thus realizing the one-way propagation of the electromagnetic wave and effectively solving the reflection problem of the electromagnetic wave. At the same time, in view of the problem that the surface wave is difficult to radiate into the air on the first medium section 31, in the present invention, a second medium section 32 is further designed, and the second medium section 32 is used as a radiation antenna to radiate microwave energy to the air. In the heating chamber 10, high-efficiency heating of the object 41 to be heated by microwaves is realized in the heating chamber 10.

Embodiment 2

Figure 6:
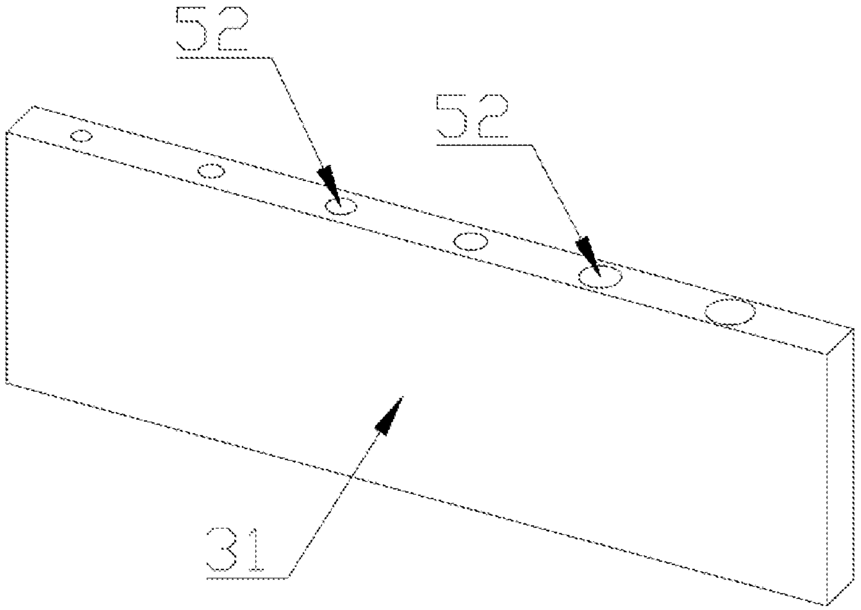
FIG. 6 is a schematic longitudinal cross-sectional structural diagram of the high-efficiency heating device in the microwave chamber according to an Embodiment 2 of the present invention.

As shown in FIG. 6, this embodiment is the second embodiment of the present invention. The present embodiment provides a high-efficiency heating device in a microwave chamber, comprising: a heating chamber 10, a straight-walled waveguide 20 with asymmetric transmission function and one end connected with the heating chamber 10, and two sets of unidirectional waveguide structures 30. The difference between the Embodiment 2 and Embodiment 1 is that, in the Embodiment 2, the second medium section 32 and the first medium section 31 are of a one-piece structure and are made of an identical material, and the dielectric constant of the first medium section 31 gradually increases along the transmission direction of the microwave and has a maximum value of $\varepsilon_{max}$, the second medium section 32 has a constant dielectric constant of $\varepsilon_c$, and $\varepsilon_{max}=\varepsilon_c$.

Embodiment 3

This embodiment is the third embodiment of the present invention, and is an application embodiment of the present invention, and the details are as follows:

In this embodiment, the heating effect of the microwave chamber high-efficiency heating device provided in Embodiment 1 is tested by simulation via COMSOL MULTIPHYSICS 5.5. A real part of the dielectric constant of the to-be-heated object 41 is at a range of 20 to 100, and a step interval is 10, a loss angle remains unchanged at 0.2, the object heated is a cylinder with a height of 50 mm, and a radius of 20 mm, 25 mm and 30 mm, and a cuboid with a height of 50 mm, the bottom area of 30 mm*30 mm, 40 mm*40 mm and 50 mm*50 mm respectively.

Figure 7:
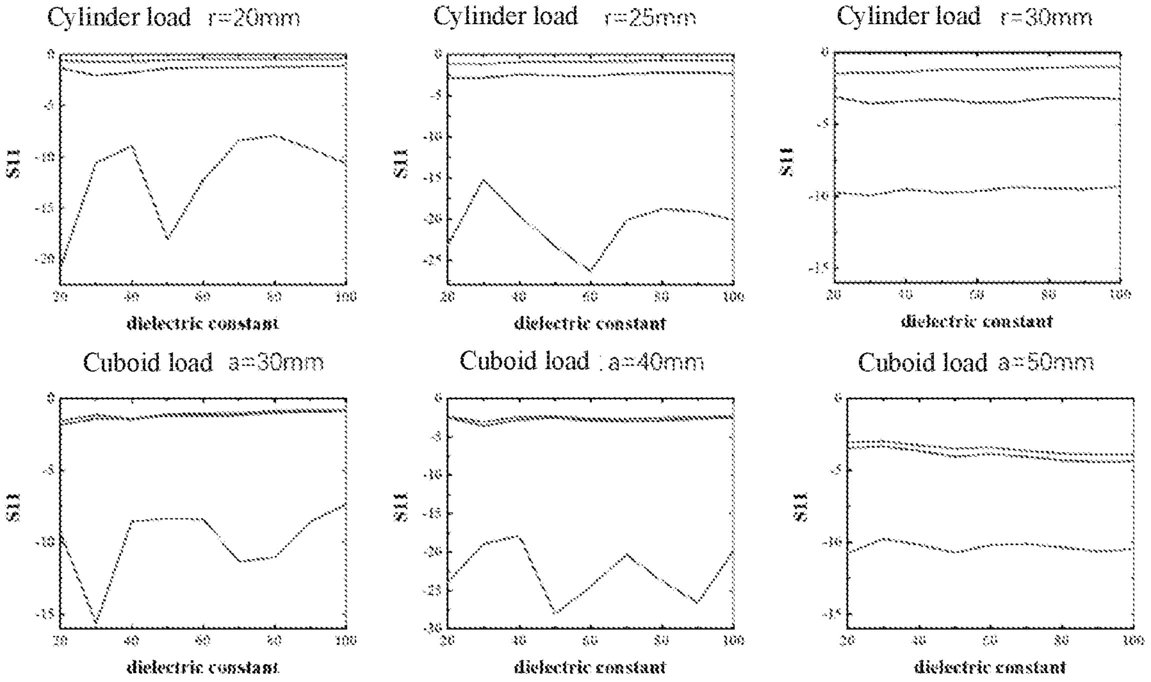
FIG. 7 is a simulation test result of the high-efficiency heating device in a microwave chamber and a heating method thereof provided in an Embodiment 3 of the present invention.

The experimental results use S11 to evaluate the microwave heating efficiency, and the simulation test results are shown in Table 1 and FIG. 7.

TABLE 1

Simulation test results of a microwave chamber high-efficiency heating device provided in Example 1

| | | Dielectric coefficients of objects to be heated | | | | | | | | |
|---|---|---|---|---|---|---|---|---|---|---|
| | | 20 | 30 | 40 | 50 | 60 | 70 | 80 | 90 | 100 |
| Cylindrical base radius 20 mm | S11 (1) | −1.3512 | −2.0597 | −1.768 | −1.3692 | −1.2665 | −1.2867 | −1.2311 | −1.1683 | −1.1683 |
| | S11 (2) | −0.57484 | −0.72666 | −0.67142 | −0.54806 | −0.46497 | −0.46143 | −0.44676 | −0.43296 | −0.41541 |
| | S11 (3) | −20.779 | −10.591 | −8.9432 | −18.053 | −12.25 | −8.3953 | −7.9102 | −9.2023 | −10.635 |
| Cylindrical base radius 25 mm | S11 (1) | −2.866 | −2.8263 | −2.4548 | −2.5675 | −2.6564 | −2.3533 | −2.2084 | −2.2455 | −2.2799 |
| | S11 (2) | −1.1124 | −1.1637 | −0.91112 | −0.84579 | −0.87926 | −0.78431 | −0.70838 | −0.68697 | −0.68927 |
| | S11 (3) | −23.171 | −15.139 | −19.532 | −23.308 | −26.341 | −20.108 | −18.771 | −19.084 | −20.103 |
| Cylindrical base radius 30 mm | S11 (1) | −3.0704 | −3.5385 | −3.3842 | −3.2525 | −3.4758 | −3.4486 | −3.1593 | −3.1363 | −3.2286 |
| | S11 (2) | −1.4441 | −1.4119 | −1.3754 | −1.1862 | −1.1795 | −1.1661 | −1.0611 | −0.99201 | −0.98614 |
| | S11 (3) | −9.7188 | −9.9321 | −9.5008 | −9.7156 | −9.6417 | −9.329 | −9.4325 | −9.4762 | −9.3023 |
| Square base radius 30 mm* 30 mm | S11 (1) | −1.8493 | −1.3858 | −1.4399 | −1.195 | −1.1947 | −1.1563 | −0.99832 | −0.89813 | −0.88306 |
| | S11 (2) | −1.5701 | −1.1347 | −1.402 | −1.0954 | −1.0307 | −1.0078 | −0.87764 | −0.80474 | −0.81742 |
| | S11 (3) | −9.3115 | −15.603 | −8.5271 | −8.3449 | −8.3919 | −11.329 | −11.032 | −8.5596 | −7.3621 |
| Square base radius 40 mm* 40 mm | S11 (1) | −2.4725 | −3.5952 | −2.7483 | −2.5224 | −2.8687 | −3.027 | −2.8465 | −2.6331 | −2.5468 |
| | S11 (2) | −2.3408 | −3.0491 | −2.3833 | −2.3031 | −2.6683 | −2.705 | −2.5234 | −2.3597 | −2.3236 |
| | S11 (3) | −23.964 | −18.94 | −17.861 | −28.047 | −24.497 | −20.335 | −23.785 | −26.596 | −19.852 |
| Square base radius 50 mm* 50 mm | S11 (1) | −3.4441 | −3.3249 | −3.647 | −4.0438 | −3.8624 | −4.0551 | −4.2901 | −4.4168 | −4.3681 |
| | S11 (2) | −3.0437 | −2.9713 | −3.2563 | −3.4827 | −3.3958 | −3.6441 | −3.8265 | −3.9001 | −3.9073 |
| | S11 (3) | −10.737 | −9.7566 | −10.153 | −10.702 | −10.172 | −10.098 | −10.337 | −10.607 | −10.471 |

In Table 1, S11(1) represents the heating effect when the first medium section 31 and the second medium section 32 are not provided in the heating device, and S11(2) represents that the heating device is only provided with the first medium section 31, and the heating effect when the second medium section 32 is not provided, S11 (3) represents the heating effect when the first medium section 31 and the second medium section 32 are simultaneously provided in the heating device.

Example 4

This embodiment is the fourth embodiment of the present invention. This embodiment provides a microwave chamber high-efficiency heating device, which is different from Embodiment 1 in that:

In this embodiment, only one set of the one-way guided wave structure 30 is provided, and the structure of the one-way guided wave structure 30 is the same as that of the first embodiment (the first dielectric section 31 is set in the third mode). The structure 30 is fixedly mounted on any inner side wall of the straight-walled waveguide 20.

Example 5

This embodiment is the fifth embodiment of the present invention, and is an application embodiment of the present invention, and the details are as follows:

In this embodiment, the heating effect of the object 41 to be heated by the microwave chamber high-efficiency heating device provided in Embodiment 4 is tested by simulation, and the details are as follows:

Test 1:

The volume of the object to be heated 41 is 40*40*25 mm, the loss angle is 0.1 to 1, and the real part of the dielectric constant of the object to be heated 41 is 20 to 100. S11 is used as the evaluation index of its heating effect. The test results are as follows Table 2 shows:

TABLE 2

Simulation test results of a microwave chamber high-efficiency heating device provided in Example 4

| Loss angle/dielectric coefficient | 10 | 20 | 30 | 40 | 50 | 60 | 70 | 80 | 90 | 100 |
|---|---|---|---|---|---|---|---|---|---|---|
| 0.1 | −10.579 | −3.5672 | −11.487 | −14.986 | −11.933 | −13.887 | −8.1881 | −8.4374 | −7.5791 | −6.2503 |
| 0.2 | −9.7812 | −5.7019 | −10.808 | −12.243 | −12.45 | −12.048 | −9.7711 | −9.0381 | −8.3994 | −8.0102 |
| 0.3 | −9.614 | −7.2618 | −10.912 | −12.062 | −12.345 | −11.649 | −10.42 | −9.6973 | −9.2237 | −9.0287 |
| 0.4 | −9.6281 | −8.4448 | −11.25 | −12.217 | −12.319 | −11.67 | −10.843 | −10.252 | −9.8752 | −9.6987 |
| 0.5 | −9.6732 | −9.3738 | −11.658 | −12.457 | −12.419 | −11.847 | −11.204 | −10.706 | −10.364 | −10.15 |
| 0.6 | −9.7443 | −10.136 | −12.088 | −12.738 | −12.607 | −12.085 | −11.528 | −11.069 | −10.721 | −10.45 |
| 0.7 | −9.8499 | −10.789 | −12.52 | −13.041 | −12.842 | −12.337 | −11.808 | −11.35 | −10.969 | −10.641 |
| 0.8 | −9.9916 | −11.369 | −12.947 | −13.354 | −13.092 | −12.576 | −12.038 | −11.553 | −11.129 | −10.742 |
| 0.9 | −10.166 | −11.896 | −13.362 | −13.666 | −13.337 | −12.783 | −12.21 | −11.684 | −11.21 | −10.772 |
| 1 | −10.367 | −12.386 | −13.765 | −13.967 | −13.558 | −12.947 | −12.324 | −11.75 | −11.225 | −10.744 |

Table 3 shows the test results of heating the object 41 to be heated by using a conventional microwave heating mechanism. The difference between the conventional microwave heating mechanism and a microwave chamber high-efficiency heating device provided in Example 4 is that the conventional microwave heating mechanism is not provided with for the one-way guided wave structure 30, the simulation test results are shown in Table 3:

TABLE 3

Simulation test results of heating effect of conventional microwave oven

| Loss angle/dielectric coefficient | 10 | 20 | 30 | 40 | 50 | 60 | 70 | 80 | 90 | 100 |
|---|---|---|---|---|---|---|---|---|---|---|
| 0.1 | −3.8117 | −10.898 | −4.3871 | −12.279 | −7.1034 | −6.4564 | −8.7335 | −17.456 | −13.807 | −9.2008 |
| 0.2 | −5.9754 | −9.6261 | −6.5686 | −9.3422 | −8.1747 | −8.4066 | −10.732 | −13.201 | −12.419 | −10.89 |
| 0.3 | −6.8257 | −8.9933 | −7.6219 | −8.9152 | −8.9706 | −9.6373 | −11.251 | −12.363 | −12.218 | −11.71 |
| 0.4 | −7.0793 | −8.6131 | −8.1606 | −9.0115 | −9.6229 | −10.449 | −11.619 | −12.371 | −12.508 | −12.393 |
| 0.5 | −7.1189 | −8.3925 | −8.4858 | −9.2682 | −10.193 | −11.062 | −12.032 | −12.721 | −13.025 | −13.083 |
| 0.6 | −7.0952 | −8.2785 | −8.7294 | −9.5819 | −10.71 | −11.599 | −12.513 | −13.242 | −13.665 | −13.811 |
| 0.7 | −7.0605 | −8.2367 | −8.9463 | −9.9175 | −11.196 | −12.119 | −13.059 | −13.869 | −14.388 | −14.581 |
| 0.8 | −7.0317 | −8.2444 | −9.1592 | −10.263 | −11.668 | −12.649 | −13.662 | −14.575 | −15.177 | −15.388 |
| 0.9 | −7.0126 | −8.2868 | −9.3764 | −10.612 | −12.138 | −13.201 | −14.32 | −15.348 | −16.023 | −16.222 |
| 1 | −7.0036 | −8.3544 | −9.6008 | −4.5672 | −12.616 | −13.784 | −15.032 | −16.186 | −16.92 | −17.066 |

Test 2:

Keep the dielectric constant of the object to be heated 41 (the dielectric constant is 50) unchanged, change the volume of the object to be heated 41, and use the microwave chamber high-efficiency heating device provided in Example 4 to heat the object 41 to be heated by 511 evaluation. The heating effect at the time is advanced, and the simulation test results are shown in Table 4:

TABLE 4

Simulation test results of a microwave chamber high-efficiency heating device provided in Example 4

| Height/Basal area | 40*40 mm | 50*50 mm | 60*60 mm | 70*70 mm | 80*80 mm | 90*90 mm | 100*100 mm |
|---|---|---|---|---|---|---|---|
| 20 mm | −5.7446 | −8.901 | −8.0958 | −9.1384 | −11.618 | −10206 | −7.6584 |
| 25 mm | −15.909 | −17.39 | −18.58 | −32.213 | −16.37 | −10.087 | −6.4438 |
| 30 mm | −9.9914 | −12.262 | −18.565 | −15.51 | −13.491 | −9.6889 | −7.1264 |
| 35 mm | −14.569 | −17.988 | −16.474 | −21.191 | −13.828 | −9.2178 | −7.0825 |
| 40 mm | −11.731 | −20.015 | −16.097 | −26.745 | −12.977 | −86916 | −7.473 |
| 45 mm | −7.7071 | −11.445 | −14.557 | −20.001 | −11.708 | −8.4746 | −6.8556 |
| 50 mm | −4.8087 | −8.8169 | −11.425 | −13.834 | −10.7 | −81985 | −6.9612 |

Table 5 shows the test results of heating the object 41 to be heated by using a conventional microwave heating mechanism. The test is to keep the dielectric constant of the object to be heated (dielectric constant is 50) unchanged, and to change the volume of the object to be heated 41. The simulation test The results are shown in Table 5:

TABLE 5

Simulation test results of heating effect of conventional microwave heating mechanism

| Height/Basal area | 40*40 $mm^2$ | 40*40 $mm^2$ | 40*40 $mm^2$ | 40*40 $mm^2$ | 40*40 $mm^2$ | 40*40 $mm^2$ | 40*40 $mm^2$ |
|---|---|---|---|---|---|---|---|
| 20 mm | −5.1118 | −8.1293 | −5.7894 | −3.5336 | −2.6914 | −2.1908 | −2.73 |
| 25 mm | −7.1034 | −9.4271 | −6.5327 | −4.6989 | −4.2393 | −5.6278 | −6.2631 |
| 30 mm | −7.1457 | −10.129 | −5.5216 | −4.1339 | −4.2184 | −5.2745 | −5.3021 |
| 35 mm | −7.9338 | −5.4797 | −3.7443 | −3.6204 | −3.3576 | −3.818 | −5.038 |
| 40 mm | −6.8863 | −4.9601 | −4.3352 | −4.0655 | −5.3117 | −6.2038 | −7.2534 |
| 45 mm | −5.5535 | −5.9048 | −4.8562 | −5.0022 | −6.345 | −7.1393 | −7.9931 |
| 50 mm | −7.9124 | −5.9288 | −3.7321 | −4.3967 | −6.4249 | −8.0512 | −12.528 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A high-efficiency heating device in a microwave chamber, comprising:

a heating chamber;

a straight-walled waveguide with an asymmetric transmission function; wherein one end of the straight-walled waveguide is communicated with the heating chamber; and at least one group of microwave unidirectional propagation structures, which are attached to an inner sidewall of the straight-walled waveguide; wherein the at least one group of the microwave unidirectional propagation structures comprise a first medium section and a second medium section which are provided along a microwave transmission direction; wherein a dielectric constant of the first medium section gradually increases along the microwave transmission direction and has a maximum value of $\varepsilon_{max}$, a dielectric constant of the second medium section is a constant value of $\varepsilon_c$, and $\varepsilon_{max}=\varepsilon_c$;

wherein a tail end of the second medium section protrudes out of the straight-walled waveguide and partially extends into an interior of the heating chamber.

2. The high-efficiency heating device in the microwave chamber, as recited in claim 1, wherein a head end of the second medium section is in directly connected with a tail end of the first medium section, or the second medium section and the first medium are a one-piece structure.

3. The high-efficiency heating device in the microwave chamber, as recited in claim 1, wherein a thickness of the second medium section is equal to a maximum thickness of the first medium section.

4. The high-efficiency heating device in the microwave chamber, as recited in claim 1, wherein a height of the at least of one group of the unidirectional waveguide structure is greater than or equal to ⅔ of a height of the inner sidewall of the straight-walled waveguide where the at least of one group of the unidirectional waveguide structures is attached.

5. The high-efficiency heating device in the microwave chamber, as recited in claim 1, wherein a groove group is provided on one outer surface of the first medium section, and the groove group comprises a plurality of longitudinal grooves provided in parallel from a head end to a tail end of the first medium section, and a depth of the plurality of longitudinal grooves gradually decreases from the head end to the tail end of the first medium section.

6. The high-efficiency heating device in the microwave chamber, as recited in claim 1, wherein a thickness of the first medium section gradually increases from a head end to a tail end of the first medium section.

7. The high-efficiency heating device in the microwave chamber, as recited in claim 1, wherein a medium hole group is provided inside the first medium section, and the medium hole group comprises a plurality of longitudinal medium holes provided in sequence along a direction from a head end to a tail end of the first medium section, interiors of the plurality of medium holes are provided with filling medium, a cross-sections of the plurality of medium holes are all circular, and diameters of the plurality of medium holes gradually increase or decreases in the direction from the head end to the tail and of the first medium section along the first medium section.

8. The high-efficiency heating device in the microwave chamber, as recited in claim 1, wherein a tray is further provided in the heating chamber for placing an object to be heated.

9. A high-efficiency heating method in a microwave chamber, comprising: heating an object to be heated by using the high-efficiency heating device in the microwave chamber according to claim 1, wherein the object to be heated is placed in the heating chamber in a static or movable manner.

* * * * *